March 29, 1960 H. KLAUE 2,930,452
DISC BRAKE, MORE PARTICULARLY FOR MOTOR VEHICLES
Filed Sept. 9, 1958
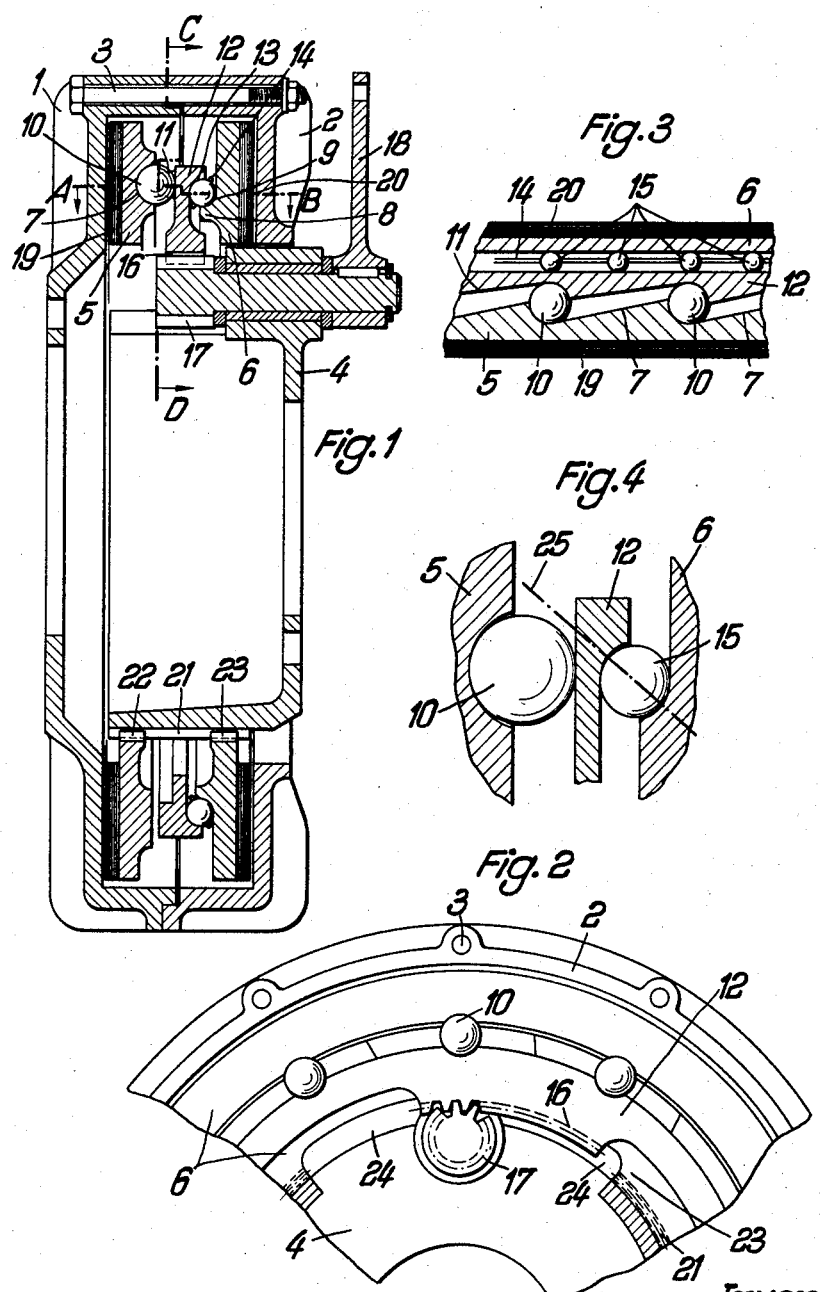
Inventor:
Hermann Klaue,
By Ernest A. Marmorek,
His Attorney

United States Patent Office

2,930,452
Patented Mar. 29, 1960

2,930,452

DISC BRAKE, MORE PARTICULARLY FOR MOTOR VEHICLES

Hermann Klaue, Uberlingen, Bodensee, Germany

Application September 9, 1958, Serial No. 759,934

Claims priority, application Germany March 14, 1958

4 Claims. (Cl. 188—72)

Disc brakes are known wherein brake discs which are mounted so as to be axially freely movable and are immovable in the peripheral direction are arranged in a rotatable ribbed housing and have brake linings disposed on the sides facing the inner surfaces of the housing. It has also already been proposed to provide between the two brake discs, for the purpose of operating the brake, a central ring which is pivotable in the peripheral direction and is coaxial to the said discs. The said ring, like the mutually facing inner sides of the brake disc, is provided with recesses which form raceways and are inclined in the peripheral direction and in which are mounted balls which, when the brake operating ring is rotated, cause the brake discs to bear against the rotating brake housing.

The invention relates to brake discs of the type specified, equipped with an operating ring arranged between the discs. The object of the invention is so to construct these discs that they are simpler to manufacture and to assemble. It is also intended to reduce the space requirements.

The solution of this problem according to the invention includes that only the inner surfaces of one brake disc and that side of the brake operating ring facing said disc are provided with inclined recesses for camming engagement of the operating balls, whereas the other side of the brake operating ring, which ring is mounted merely by means of balls on the brake discs, and the inner surface of the other brake disc each merely comprise a smooth raceway for receiving the supporting or centering balls which are held spaced from one another by a ball cage. The said supporting balls can be given a smaller diameter than the aforesaid operating balls in order to save space. Instead of these, it is also possible to use rollers. The brake operating ring is provided at one part of its inner periphery with a tooth system in which engages a pinion fixed on an operating shaft mounted in the brake carrier.

Owing to the unilateral arrangement of the inclined operating ball raceways, the accuracy of brake operation is improved since in cases where inclined ball raceways are arranged at both sides even a slight error in machining causes non-uniform application of a brake disc and therefore a poor degree of efficiency in brake operation. The arrangement of a row of supporting balls used for supporting purposes and whose balls are smaller in diameter than the brake operating balls, affords the further advantage that the entire brake assembly requires less space.

A further simplification in the production of the brake assembly more particularly with respect to the construction of the raceways of the operating balls, is achieved according to the invention in that either the surfaces or projections on the brake operating ring which form the camming tracks for the operating balls and which are inclined in the peripheral direction, or else the corresponding camming surfaces of one of the brake discs are made plane over the entire inclined portion, so that any radial section through the ball raceway constitutes a straight line extending at right-angles to the brake axis. In this way the operating balls are held fast radially at only one side. This is particularly advantageous if a brake part were distorted by thermal influences.

The brake operating ring is then supported solely on the centering balls, which roll on the second brake disc which comprises merely a smooth raceway. The centres of the raceways for all the supporting balls, which constitute the pressure application points, expediently are situated on generatrices of a cone whose axis is identical with the brake axis.

Each of the two brake discs is provided at its inner periphery with an axial tooth system which engages in a tooth system provided on the outer periphery of the cup-shaped brake carrier. In order that the brake housing and the brake unit arrangement therein can be removed without demounting the brake unit from the brake carrier, the latter is to be provided with an appropriately dimensioned recess at the place where the operating pinion is situated.

One example of embodiment is illustrated in Figures 1 to 4.

Figure 1 is a longitudinal sectional view through the axis of the disc brake. For the sake of greater clarity, those parts of the brake which are not connected with the invention have been omitted.

Figure 2 is a fragmentary side elevational view taken along the line C—D of Figure 1.

Figure 3 is a partial sectional view through the brake unit along the line A—B of Figure 1.

Figure 4 is an even smaller detail view, in section and on an enlarged scale, of the brake unit viewed in the same direction as Figure 1. In this arrangement only one brake disc comprises inclined camming surfaces of sector-shaped cross-section, and the side of the operating ring facing the said disc does not have these. The inclined camming surfaces for the operating balls on the operating ring are plane over the entire inclined portion.

In the drawings, 1 designates the brake housing which is connected by bolts 3 to the brake cover 2. Mounted in this part of the brake, which rotates with the vehicle, on the fixed brake carrier 4, is the brake unit which is axially displaceable on the latter and which consists of two brake discs 5 and 6 and a brake operating ring 12. The brake disc 5 is provided with recesses 7 which are distributed uniformly over its periphery and which are inclined in the peripheral direction, and in which the operating balls 10 are mounted. The other brake disc 6 comprises an annular projection 8 which is directed towards the brake operating ring 12 and which is used for carrying the raceway 9 for the supporting balls 15. The ball raceways 7 of the brake disc 5 are situated opposite the raceways 11 of the brake operating ring 12 which are inclined in the peripheral direction and are constructed as plane surfaces in contrast to the raceways 7. The raceways 7 and 11 form a series of inclined channels, and an operating ball 10 is disposed in each channel in rolling contact with the raceways 7 and 11 thereof.

The brake operating ring 12 comprises a ball raceway 13 which is associated with the ball raceway 9 of the brake disc 6. It bears on the brake disc 6 by means of the supporting balls 15 which are held by the cage 14. For rotating the brake operating ring 12, the inner periphery thereof is provided with a toothed segment 16 in which engages the pinion 17 which is mounted in the brake carrier 4 and is connected to the brake operating lever 18. The brake discs 5 and 6 are provided at their outer sides with brake linings 19 and 20 which, when the brake is operated, are made to contact the rotating housing parts 1 and 2. The brake discs 5 and 6 are supported on an axial tooth system 21 of the brake carrier 4. The inner toothing 22 of the brake disc ring 5 and the inner toothing 23 of the brake disc ring 6 engage in this toothing 21.

In order that the brake housing 1, 2 and the brake unit 5, 6, 12 arranged therein can be removed from the brake carrier without demounting the brake unit, the brake carrier 4 comprises, at the place where the operating pinion 17 for the brake operating ring 12 is situated, a recess 24 which in practice represents only an interruption of the tooth system 21 of the brake carrier 4.

In Figure 4, the chain-dotted straight line 25 indicates that the brake operating ring 12 is so supported on the brake disc 6 that the centres of the raceways of the supporting balls 15 lie on the generatrices of a cone whose axis is identical with the brake axis.

I claim:

1. In a disc brake having a stationary brake carrier and a rotatable brake housing surrounding two non-rotating brake discs displaceable on said carrier axially of the housing axis for frictional brake engagement of the housing interior and an operating disc disposed in said housing between said brake discs and turnable about the axis of said housing independently of the housing rotation to move said brake discs apart, the combination of, the inner surface of one of said brake discs defining with one surface of said operating disc adjacent said one brake disc a series of channels each inclined relative to the periphery of said discs, one of said surfaces having a series of inclined raceway recesses each forming a part of a channel, the other of said surfaces having a series of inclined plane raceway faces each forming another part of a channel, a rotating wedge element disposed in each channel and being operable to roll on said inclined raceways for camming engagement thereof, a first annular raceway formed on the inner surface of the other brake disc, a second annular raceway formed on the opposite surface of said operating disc adjacent said second brake disc, a plurality of rolling elements disposed between said first and second annular raceways and in rolling contact therewith whereby, upon turning of said operating disc, said wedge elements will drive apart said one brake disc from said operating disc and other braking disc for braking action, and means connected to said brake carrier and operable for turning said operating disc.

2. In a disc brake, as claimed in claim 1, said recesses being formed on said one brake disc, and said faces being formed on said one surface of said operating ring.

3. In a disc brake, as claimed in claim 1, said first and second annular raceways having their center portions facing each other along the surface of a cone having an axis coinciding with the axis of rotation of said housing.

4. In a disc brake, a brake mechanism for use on the interior of a rotatable brake housing, and connected to a stationary brake carrier, said brake mechanism comprising two oppositely disposed brake discs each operable to be displaced to make frictional braking contact with an internal surface of the housing, means for displacing said brake discs axially of the axis of rotation of said housing comprising an operating disc disposed in said housing between said brake discs, the inner surface of one of said brake discs and the adjacent one surface of said operating disc defining a series of channels each inclined relative to the periphery of said discs and including a recess formed in one of said surfaces and a plane face formed on the other surface, a rolling wedge element disposed in each channel, thrust bearing means formed between said operating disc and the other brake disc, and means operable for rotating externally of said housing said operating ring.

References Cited in the file of this patent

UNITED STATES PATENTS

| | | |
|---|---|---|
| 1,875,434 | Frankland | Sept. 6, 1932 |
| 2,307,652 | Whitten | Jan. 5, 1943 |
| 2,329,097 | Ash | Sept. 7, 1943 |

FOREIGN PATENTS

| | | |
|---|---|---|
| 834,183 | Germany | Mar. 17, 1952 |
| 167,254 | Great Britain | Aug. 2, 1921 |